(12) United States Patent
Shen

(10) Patent No.: US 7,190,644 B2
(45) Date of Patent: Mar. 13, 2007

(54) TRACK-LOCKING METHOD AND APPARATUS FOR OPTICAL DISK DRIVE

(75) Inventor: Yung-Chi Shen, Taiwan (TW)

(73) Assignee: Mediatek, Inc. (TW)

( * ) Notice: Subject to any disclaimer, the term of this patent is extended or adjusted under 35 U.S.C. 154(b) by 336 days.

(21) Appl. No.: 10/711,384

(22) Filed: Sep. 15, 2004

(65) Prior Publication Data

US 2005/0068861 A1 Mar. 31, 2005

(30) Foreign Application Priority Data

Sep. 30, 2003 (TW) .............................. 92127089 A

(51) Int. Cl.
*G11B 7/00* (2006.01)
(52) U.S. Cl. .............................. 369/44.28; 369/44.25; 369/44.29
(58) Field of Classification Search ...................... None
See application file for complete search history.

(56) References Cited

U.S. PATENT DOCUMENTS

| | | | | |
|---|---|---|---|---|
| 4,817,073 A | * | 3/1989 | Suzuki ..................... | 369/44.28 |
| 5,101,386 A | * | 3/1992 | Kojima et al. ............ | 369/44.28 |
| 5,220,547 A | * | 6/1993 | Yasukawa et al. ........ | 369/44.28 |
| 5,604,722 A | * | 2/1997 | Suzuki ..................... | 369/44.28 |
| 5,760,991 A | * | 6/1998 | Semba ..................... | 369/44.11 |
| 6,292,444 B1 | * | 9/2001 | Ikeda et al. .............. | 369/44.29 |
| 6,339,567 B1 | * | 1/2002 | Shimamoto et al. ...... | 369/44.35 |
| 6,628,580 B1 | * | 9/2003 | Kishimoto et al. ....... | 369/44.28 |

* cited by examiner

*Primary Examiner*—Thang V. Tran
(74) *Attorney, Agent, or Firm*—Connolly Bove Lodge & Hutz, LLP; Larry Hume

(57) ABSTRACT

A track-locking method for an optical disk drive is conducted according to the following steps. First, a tracking error signal (TE signal) is detected, and then the time period for a pickup head jumping from one track to another track is divided into four periods. Secondly, the extreme values of the reshaped tracking error signal (TE' signal) in the first, second and third periods are preset, and the TE signal of the first period is reshaped in view of the extreme value of the TE' signal in the first period and the crest value or the trough value of the TE signal, so as to form the TE' signal in the first period. Then, a line connecting the extreme values of the TE' signal in the first period and the second period is established as the TE' signal in the second period, and a line connecting the extreme values of the TE' signals in the second and third periods is established as the TE' signal in the third period. The TE' signal curve in the above-described periods can be obtained by the manners of linear connection or proportionally reshaping the TE signal.

27 Claims, 9 Drawing Sheets

TRACK-LOCKING METHOD AND APPARATUS FOR OPTICAL DISK DRIVE

BACKGROUND OF THE INVENTION (A) Field of the Invention

The present invention is related to a track-locking method and the relevant implementation apparatus for an optical disk drive, more specifically, to a track-locking method and the relevant implementation apparatus for an optical disk drive by reshaping tracking error signals.

(B) Description of the Related Art

In the design of the control chip for an optical disk drive, the track-locking of the pickup head of the optical disk drive is a very important control mechanism. Regardless of the manners of so-called static tracking-on or the track-locking after seeking, they all directly affect the data accessing speed and quality of the optical disk drive.

Based on the principle that the optical disk has different optical reflectivity for the on-track period and the off-track period, the optical disk drive utilizes a pickup head to emit a light beam onto the optical disk, and uses an optical sensor to detect the intensity variance of the reflected lights, so as to obtain the so-called tracking error (TE) signal, and determine whether the position of the pickup head is correct. With respect to the different positions of the pickup head, the TE signal can be linked as a curve similar to a sine wave as shown in the upper part of FIG. 1, where the on-track periods 1 and the off-track periods 2 are arranged alternatively and separated by dotted lines.

However, the TE signal generated under such structure will decrease gradually during the seek periods, i.e., the TE signal decreases gradually in the off-track periods 2 and cannot reflect the situation that the pickup head is moving away from the track. Therefore, the TE signal in the off-track periods cannot be directly employed to reflect the actual position of the pickup head.

To resolve the above-described problem, holding the extreme values of the TE signal from an on-track period to an off-track period is a known control method to prevent signal from decreasing gradually along the original sine wave, which is shown as the corrected tracking error signal in the lower part of FIG. 1. As a result, the pickup head of the optical disk drive can be positioned at the object track.

However, such peak holding method still has disadvantages, that is, when the rotation speed of the optical disk drive is relatively high, e.g., higher than 5000 rpm, or the eccentricity is relatively large, e.g., larger than 70 μm, the required control force is relatively large. Hence, the above-described method cannot provide appropriate large error amount in the off-track periods to obtain stronger control force so that it is liable to have a track-sliding issue and it is not easy to obtain an ideal control performance, resulting in needing longer track-locking time. Besides, the intervals between peaks of the TE signal are limited by the bandwidth, inducing decreases in the TE signal when the seeking speed is relatively fast. Usually, when performing the seek process, the seeking speed will be controlled to be relatively slow at the beginning and the end, and relatively fast in the middle, so the shape of the TE signal during the entire seek process shall be similar to a dog bone. However, with the development of high speed-factor and the requirements for higher performance, the seeking speed is increased. When the seeking process ends, a seeking speed that is too high may result in the signal reduction, so the TE signal during track-locking period cannot correctly reflect the deviation of the optical point of the pickup head from the track. Therefore, the track-sliding phenomenon may occur easily.

SUMMARY OF THE INVENTION

The TE signal may attenuate when the seeking speed is too high, so the track-locking braking may occur. Therefore, the TE signal cannot correctly reflect the error amount required for indicating the deviation of the optical spot of a pickup head from the track, i.e., the problem of insufficient detection amount. The objective of the present invention is to provide a track-locking method and a track-locking apparatus for an optical disk drive to resolve the above-described issues. In brief, the objective of the present invention is to solve the problems that the TE signal is too small for digital signal processing (DSP) and that the TE signal in the off-track period cannot correctly reflect the error amount required for indicating the deviation of the optical spot from the track.

In order to accomplish the above-described objective, the present invention discloses a track-locking method for an optical disk drive, comprising the steps of: detecting a TE signal; dividing the time into four periods that a pickup head jumps a track based on each 90° phase of the TE signal; presetting the extreme values of a reshaped tracking error signal (TE' signal) in the first, second and third periods; reshaping the TE signal of the first period based on the extreme value of the TE' signal in the first period and a peak value, i.e., the crest value or the trough value, of the TE signal, so as to form the TE' signal in the first period; establishing a line connecting the extreme values of the TE' signal in the first period and the second period as the TE' signal in the second period; and establishing a line connecting the extreme values of the TE' signals in the second and third periods as the TE' signal in the third period.

The TE' signal curve in the above-described periods can be obtained by the manners of linear connection or proportionally reshaping the TE signal. The linear connection can be built based on the seek time and the preset extreme values of the TE' signal. The proportionally reshaping method is based on the correlative proportion between the preset extreme values of the TE' signal and the crest or trough values of the TE signal.

The above-described track-locking method of an optical disk drive can be implemented by a track-locking apparatus, which includes an pickup head, a signal reshaping circuit, a seek control circuit, a compensator and a driver. The pickup head controlled by the driver is used for detecting a TE signal. The signal reshaping circuit is used for reshaping the TE signal so as to generate the TE' signal which then is transmitted to the compensator to generate a track-locking driving signal. The seek control circuit is connected to the signal reshaping circuit in parallel, by which a seek driving signal can be generated based on the TE signal. The driver can receive the track-locking driving signal or the seek driving signal, so as to adjust the optical laser spot of the pickup head onto a disk.

The TE' signal generated by the track-locking method and apparatus of an optical disk drive put forth in the present invention can still increase or maintain the maximum value in the off-tracking period, and therefore, the TE' signal can replace TE signal to solve the problem that the TE signal decreases gradually in the off-tracking period. In addition, if the TE' signal was reshaped based on the seek time, it shall have a pre-compensation effect because the reshaped TE' signal is an error signal estimated in advance.

DETAILED DESCRIPTION OF THE INVENTION

Figure 1:
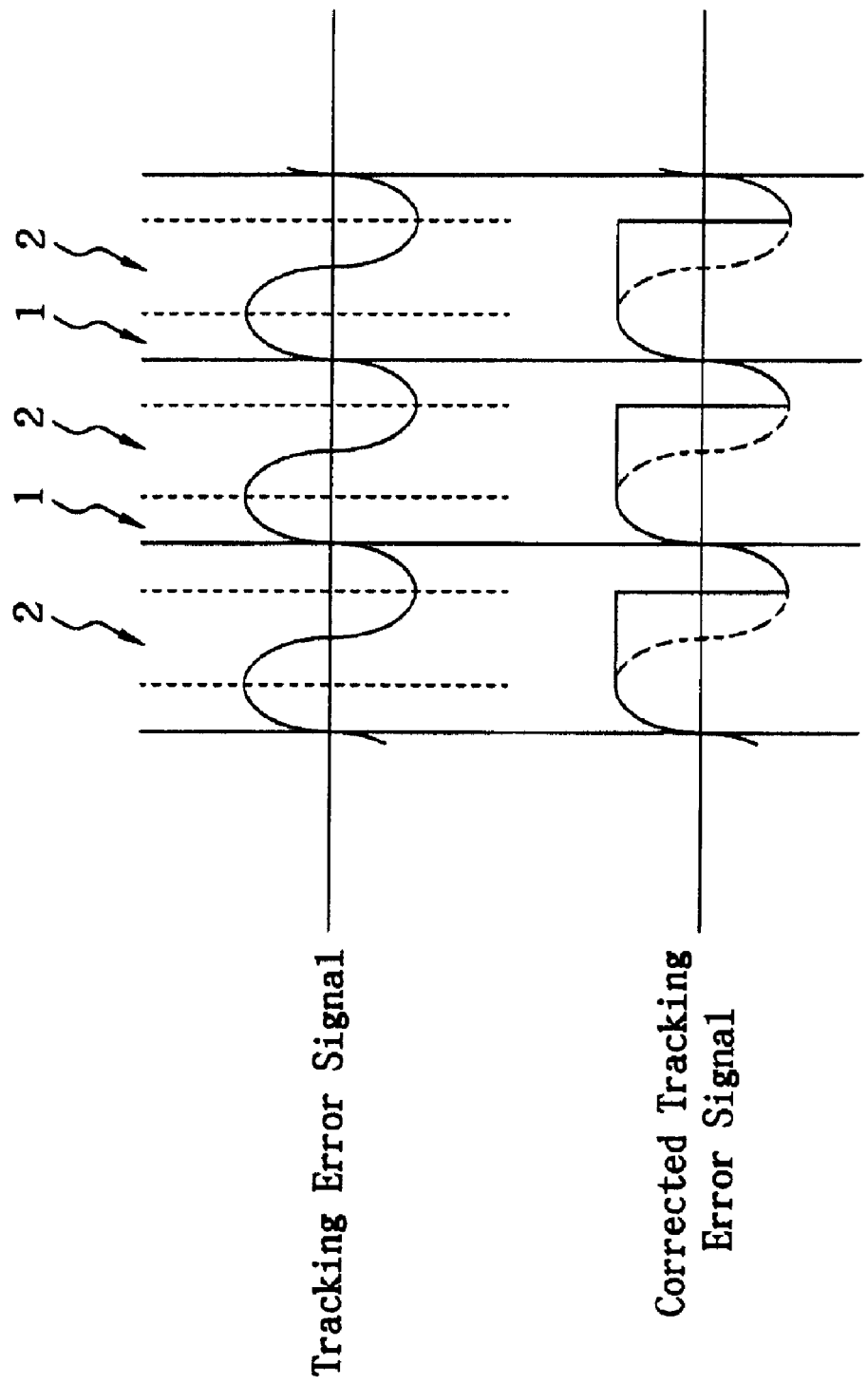
FIG. 1 illustrates a known track-locking method of an optical disk drive.
Figure 2:
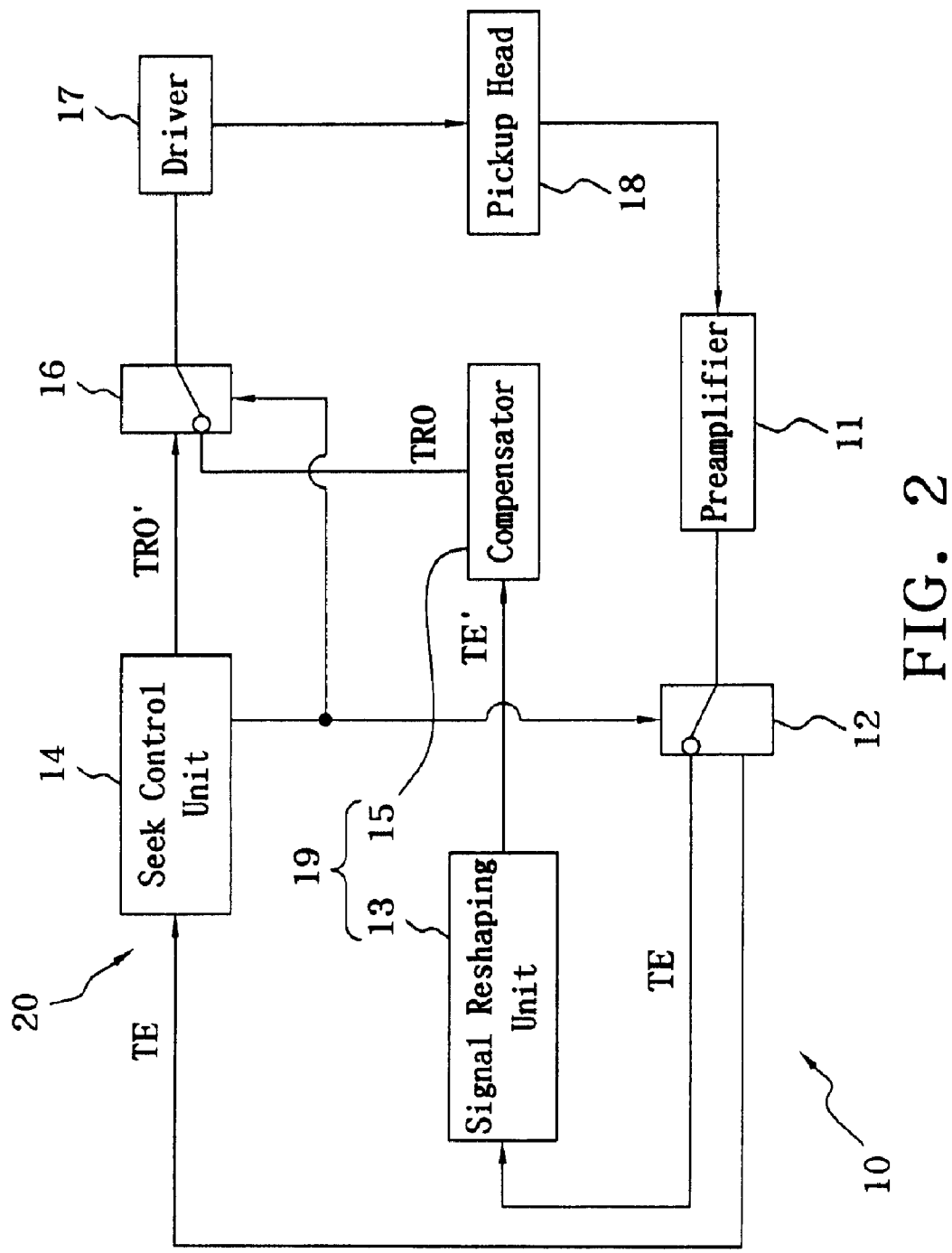
FIG. 2 illustrates a track-locking apparatus of an optical disk drive in accordance with the present invention.

FIG. 2 is an illustrative diagram of a track-locking apparatus of an optical disk drive put forth in the present invention, which forms a loop control system. An optical track-locking apparatus 10 comprises a preamplifier 11, a first switch 12, a signal reshaping unit 13, a seek control unit 14, a compensator 15, a second switch 16, a driver 17 and a pickup head 18. The preamplifier 11 can transform the signals detected by the pickup head 18 into the TE signal and amplify the TE signal for being conducted signal processing. The first switch 12 is used for switching the transmission paths of the TE signal. The signal reshaping unit 13 and the compensator 15 constitute a signal reshaping circuit 19, further the seek control unit 14 essentially constitutes a seek control circuit 20 which is in parallel with the signal reshaping circuit 19, i.e., the seek control circuit 20 and the signal reshaping circuit 19 act as two paths between the first and second switches 12 and 16. When the servo system switches to the closed loop control to proceed track-locking, the TE signal goes through the signal reshaping circuit 19 and is reshaped by the signal reshaping unit 13 to compensate the attenuation of the TE signal during high speed seeking and avoid the gradual decrease of the TE signal during off-track period. The reshaped TE signal is designated as TE', while the reshaped process from TE to TE' will be described hereinafter in detail. The seek control unit 14 can identify whether the pickup head 18 reaches the position of an object track by the seek number of the TE signal, and further determines whether to perform the track-locking process of the TE signal. The seek control unit 14 can control the switching of the first switch 12 and the second switch 16, so as to choose the TE signal's transmission path according to track-seeking process or track-locking process. The TE signal is reshaped as the TE' signal by the signal reshaping unit 13 while the track-locking is performed, and the TE' signal is transformed into an appropriate track-locking driving signal TRO by the compensator 15 to instruct the driver 17 to drive the pickup head 18 for performing track-locking. If the track-seeking process is performed, a seek driving signal TRO' will be generated.

Figure 3:
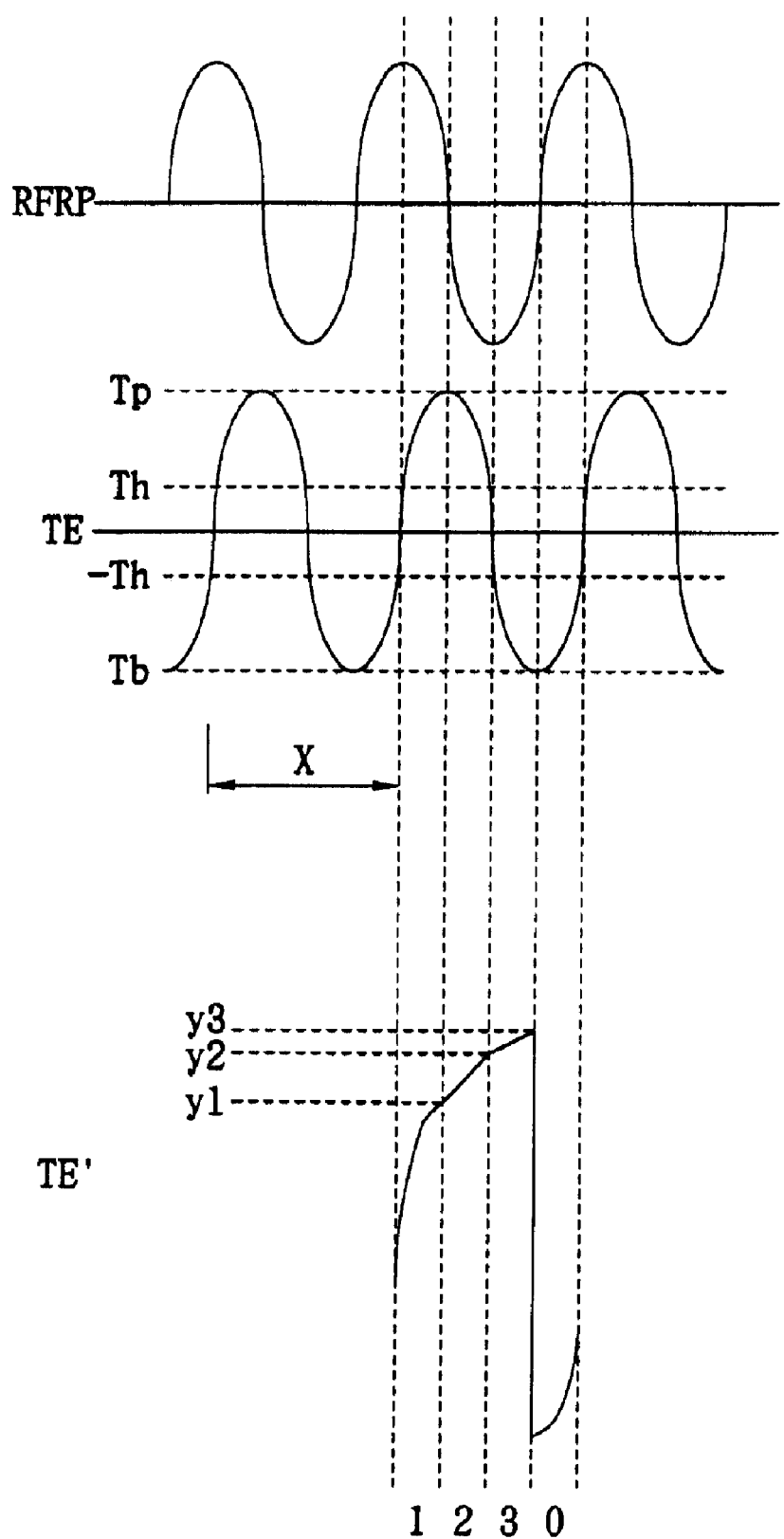
FIGS. 3 through 8 illustrate the embodiments of the track-locking method of an optical disk drive in accordance with the present invention.

As shown in FIG. 3, a 90° phase difference is normally formed between the TE signal and a radio frequency ripple (RFRP) signal. A digital signal processor (DSP) can be employed to calculate the seek time x, i.e., the period of the TE signal. The time to jump a track for the TE signal is divided into four periods based on 90° phase difference, i.e., the journey of the pickup head 18 from the center of one track to the center of the next track is divided into four periods, the second period and the third period include the off-tracking period between two adjoining tracks.

The period before the TE signal reaches the crest value Tp is a first period. If the TE signal is larger than a preset threshold value Th (or less than −Th), the TE signal will be reshaped as a TE' (reshaped tracking error) signal, of which the relational expression is as formula (1).

$$TE' = \frac{y1 \times TE}{Tx}; \tag{1}$$

wherein Tx is the crest value Tp or the trough value Tb of the real time detected TE signal, and y1 is the preset extreme value of the TE' signal (maximum positive value or minimum negative value). In this embodiment, Tx is Tp, whereas y1 is the maximum positive value. The TE' signal is obtained by reshaping the TE signal according to the proportion of y1 and Tp.

The purpose of setting the threshold value is to avoid reshaping the TE signal which, however, is not needed to be reshaped, thereby the TE signal will be deemed the TE' signal and sent to the compensator 15 to generate the track-locking driving signal TRO.

Where the TE signal passes the crest Tp and before reaching the zero-crossing point is a second period. Because of inherent physical phenomenon of the optics, the TE signal becomes weaker and weaker although the period is becoming farther and farther from the track, so that it could not correctly reflect the error amount that the pickup head 18 deviates from the track. Therefore, the TE signal reshaping is rather important in this period. The preset extreme value of the TE' signal in this period is designated as y2, and the reshaping of the TE signal can be conducted based on the seek time x or the original TE signal according to the formula (2) or formula (3) respectively.

$$TE' = y1 + \frac{4(y2 - y1)}{x} \times t \tag{2}$$

wherein t is the time counted from the TE signal passing the crest Tp or the trough Tb, i.e., the time after the pickup head enters the second period.

$$TE' = y2 - \frac{y2 - y1}{Tx} \times TE \tag{3}$$

wherein Tx is the real-time detected crest value Tp or the trough value Tb of the TE signal.

In the embodiment, Tx equals to Tp, and t is the time counted from Tp serving as the starting point. The TE' signal derived from the formula (2) is by the linear connection method, whereas the formula (3) functions for reshaping the TE signal proportionally.

The period where TE signal passes the zero-crossing point and before reaching the trough in the off-tracking period is a third period. The extreme value of the TE' signal in this period is preset as y3, and then the TE signal can be reshaped based on the seek time x or the original TE signal according to the formula (4) or (5), respectively; the principles are the same as those of the formula (2) and (3) applying to the second period.

$$TE' = y2 + \frac{4(y3 - y2)}{x} \times t \qquad (4)$$

wherein t is the time counted from the TE signal in the off-tracking period passes the zero-crossing point, i.e., the time after the pickup head enters and stays in the third period.

$$TE' = y2 + \frac{y3 - y2}{Tx} \times TE \qquad (5)$$

wherein Tx is the real-time detected crest value Tp or trough value Tb of the TE signal.

In this embodiment, Tx equals to Tb, and t is the time counted from the zero-crossing point.

The period next to the third period is a zero period, which is located before the first period of the next track. It is unnecessary to reshape the TE signal in the zero period, and the TE signal in the zero period can be deemed as the TE' signal directly.

Figure 4:
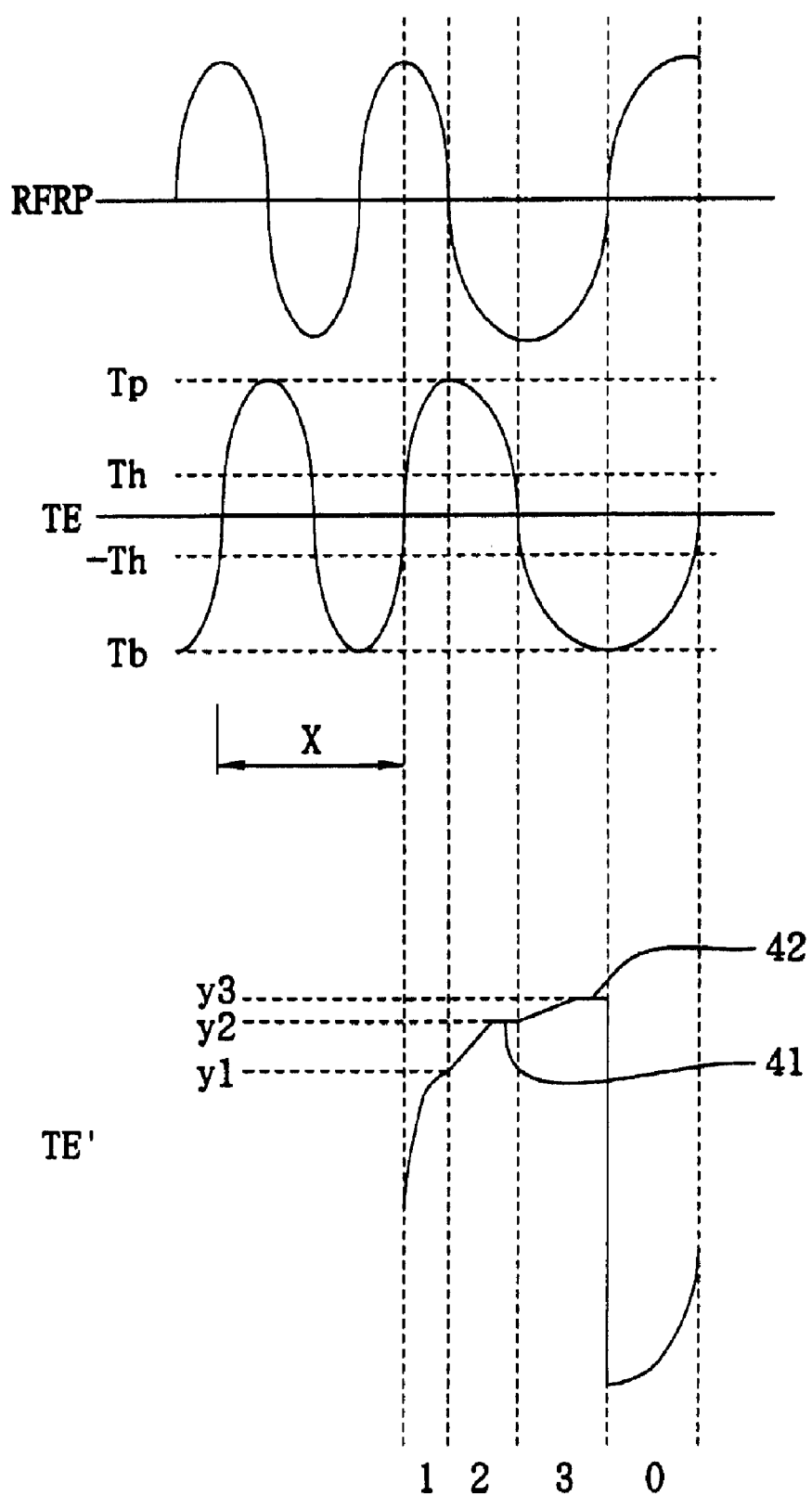

Referring to FIG. 4, when the track-locking slows down the seek speed and the returning of the pickup head has not been detected, the time periods of the second period and the third period will be enlarged, that is, the time of the second period and the third period will be larger than x/4. In the second period and the third period, the corresponding parts as t>x/4 remain the level outputs respectively derived from the formula (2) and the formula (4) at t=x/4 or other specific values, thereby horizontal regions 41, 42 are formed. Similarly, it is not necessary to reshape the TE signal in the zero period to obtain the TE' signal, and the TE signal in the zero period can be used as the TE' signal directly.

Figure 5:
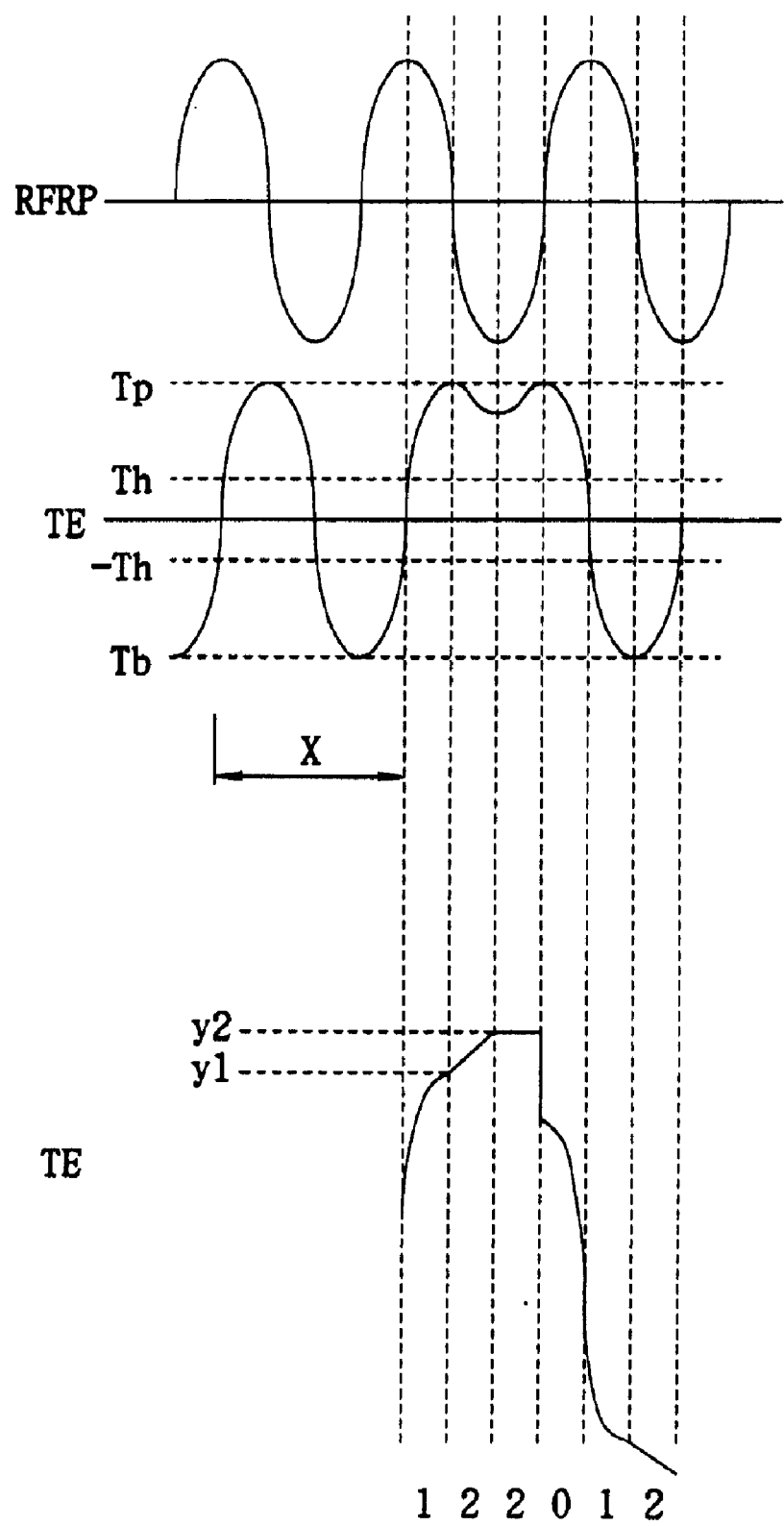

Referring to FIG. 5, when the pickup head 18 actually returns in the second period but the returning has not been detected, because the TE signal at this time is not too weak, and the TE signal will return to the crest Tp again before it goes through the zero-crossing point, the TE' signal can remain at the level of y2. When the TE signal passes the zero-crossing point, i.e., the pickup head 18 returns to the initial point, the TE signal in the next first period and the second period will be reshaped and the returning of the pickup head will be detected (the pickup head returning detection method will be explained hereinafter). Nevertheless, the TE' signal in the next first and second periods descend owing to the trend of the TE' signal's extension, in which the Tx's of the formula (1) to formula (3) are the trough value Tb, and the extreme values y1 and y2 are minimum negative values. In this embodiment, the phase of the TE signal originally precedes that of the RFRP signal, but once the returning occurs, on the contrary, the phase of TE signal will lag behind that of the RFRP signal. Therefore, the phase relation of the TE and RFRP signals can be used as an indicator for judging whether the returning of the pickup head occurs. In addition, when the returning occurs, the ascending or descending trends of the TE signal will be opposite to that of the original TE signal, so the returning event can be identified by the positive or negative signs of the TE signal's differentiation.

Figure 6:
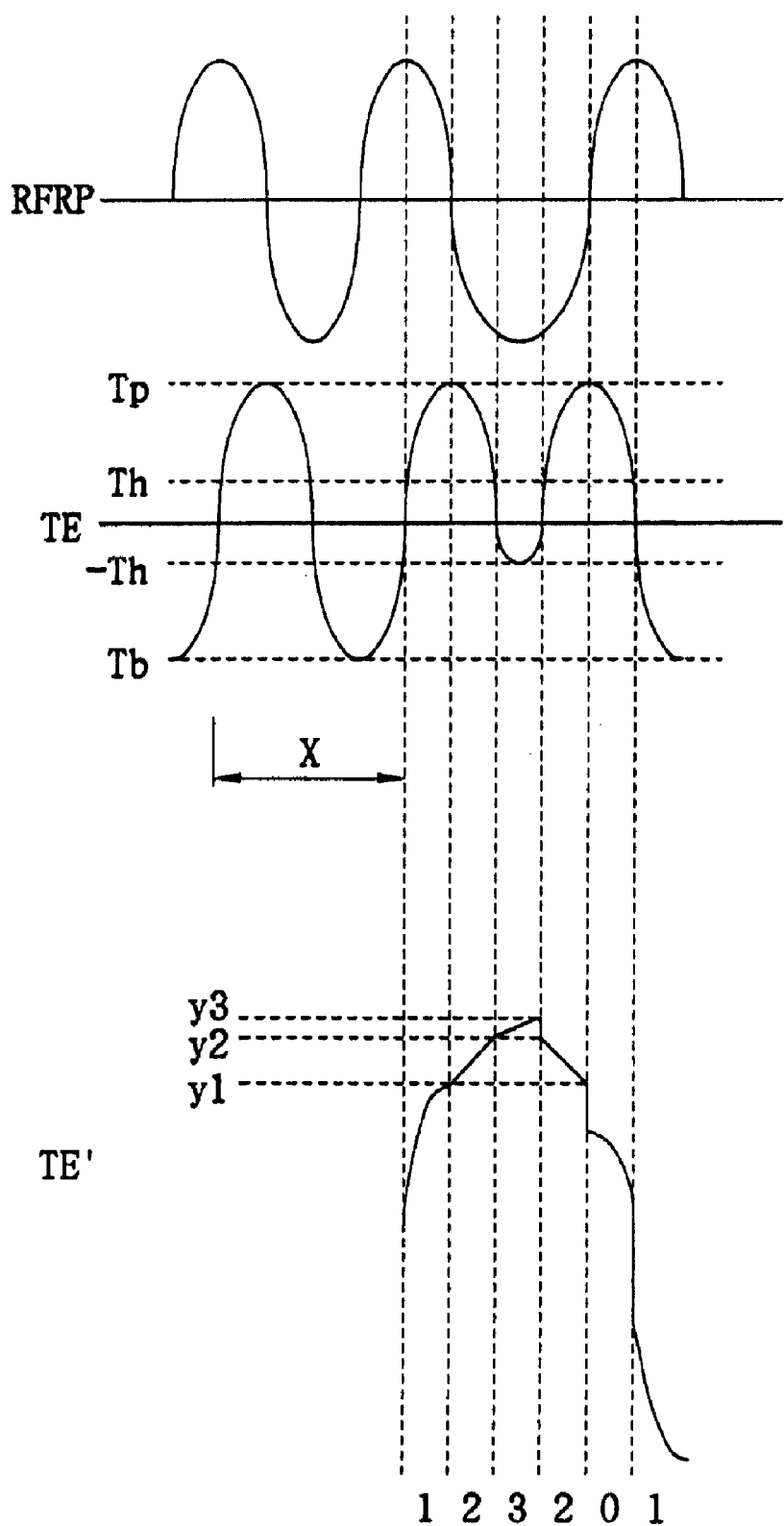

Referring to FIG. 6, if the returning of the pickup head 18 occurs in the third period, and when the pickup head 18 returns to the second period, the TE' signal decreases from the crest value y2 in the second period, i.e., the TE' signal is obtained by the formula (2) with t from x/4 to 0. Then, when the TE signal goes through the zero-crossing point, the TE' signal in the next first period will be calculated again.

In fact, the methods of generating horizontal regions and decreasingly counting time for the cases of the returning occurred in the second periods as shown in FIG. 4 and FIG. 5 also can apply to the case of returning in the third periods based on the same principles.

Figure 7:
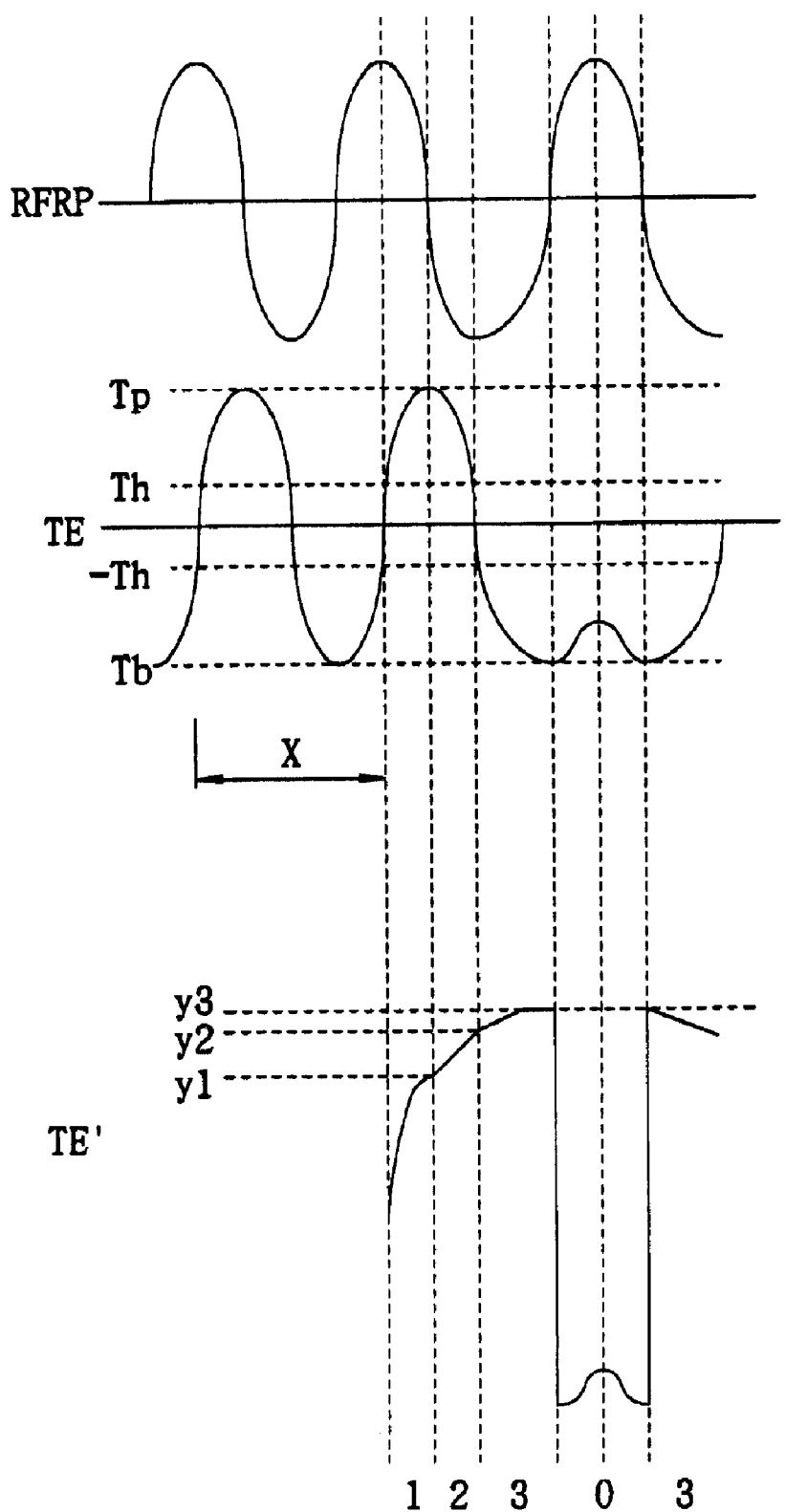

As shown in FIG. 7, if the pickup head 18 goes back to the original track after entering the zero period in the next track, then the TE' signal will generate next zero period and third period that mirrors to the original ones after the returning of the pickup head 18 occurs, in which the time t is counted decreasingly in the next third period.

Figure 8:
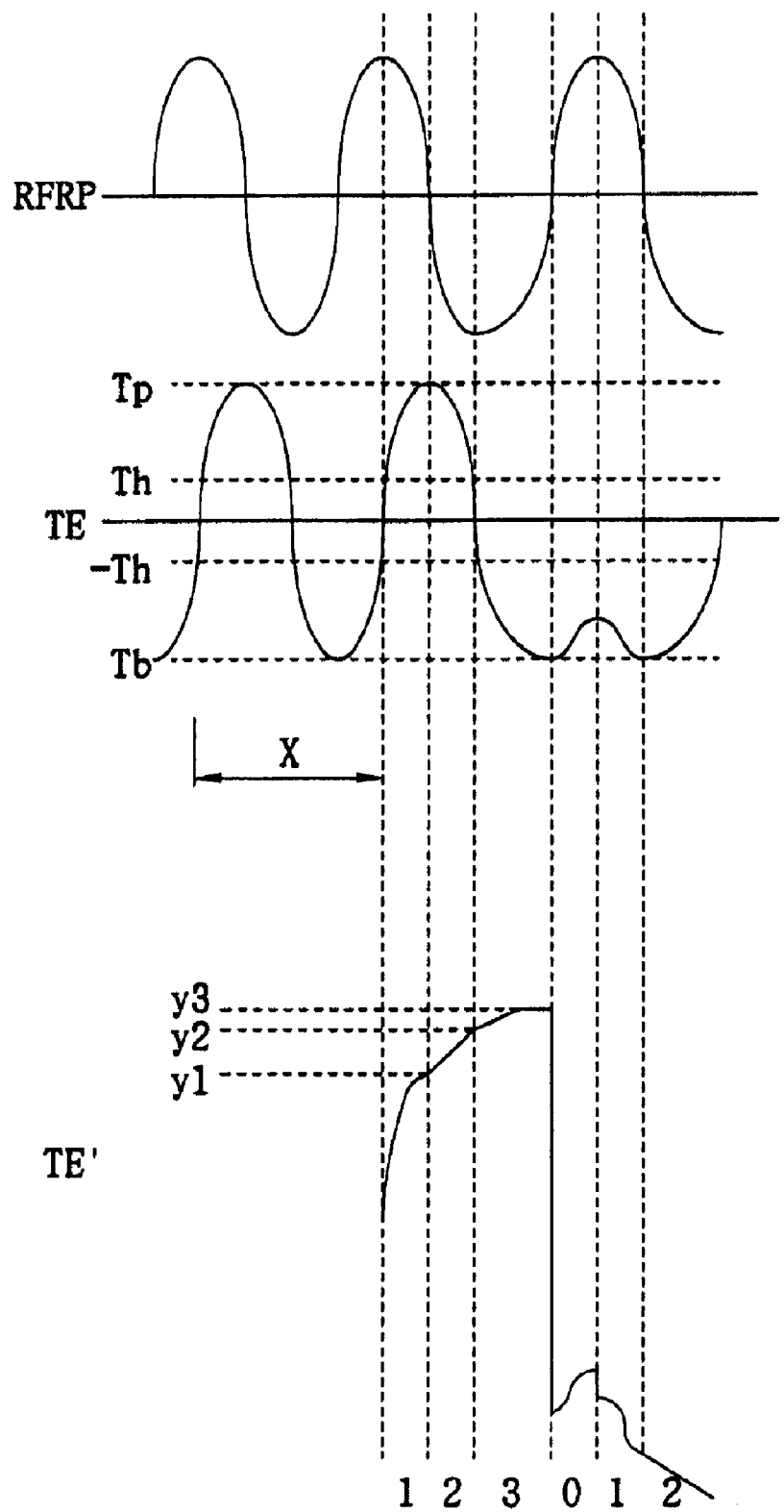

As shown in FIG. 8, if the pickup head 18 returns after entering the zero period of the next track, but the object track has been modified to be locked in the next track, the original next zero period in the FIG. 7 will be changed to another first period automatically and the moving direction of the pickup head 18 will be reversed at this time. In other words, when the pickup head returns, the period of the TE' signal will be reset as the first period once again.

Figure 9:
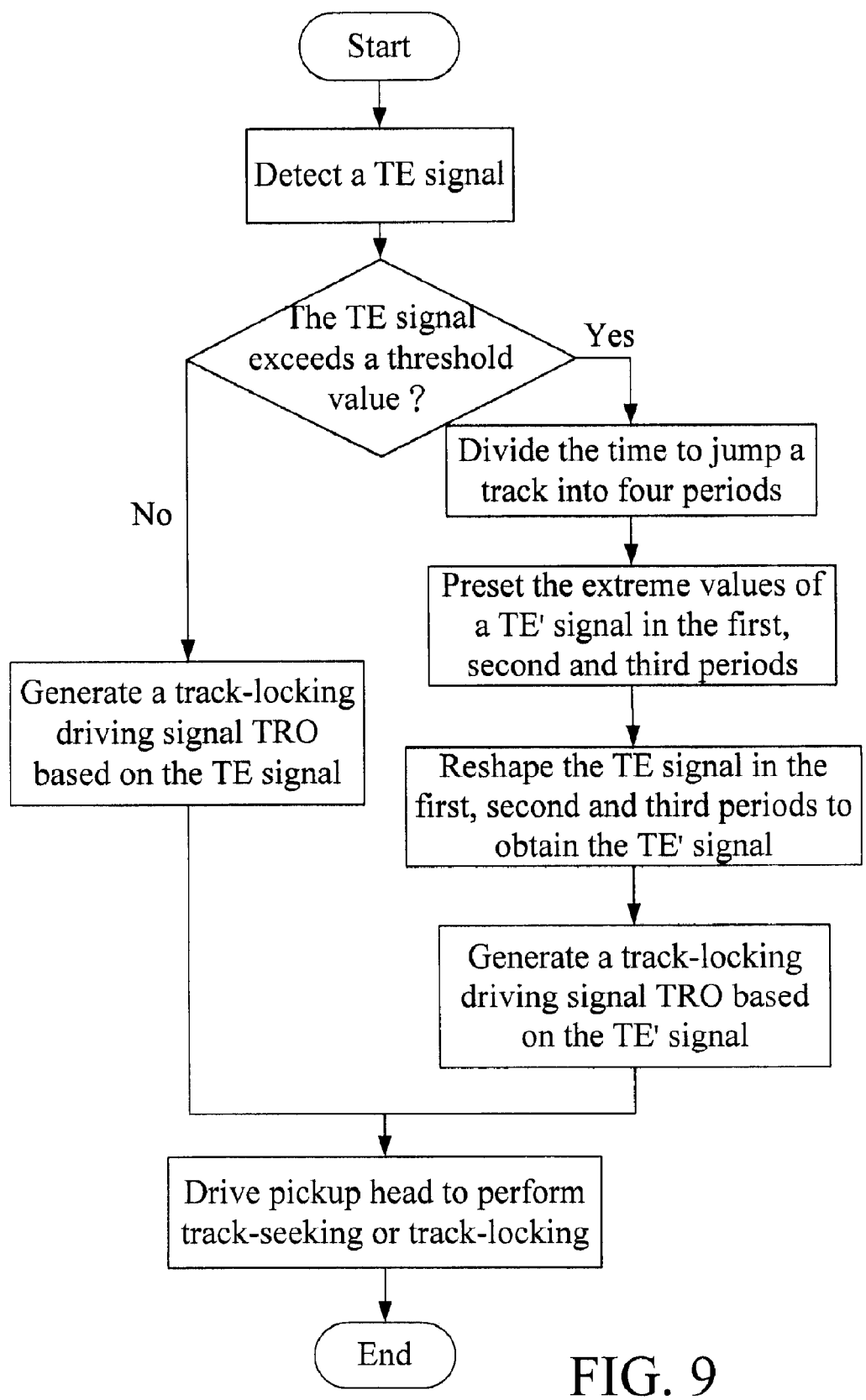
FIG. 9 illustrates the flow chart of the track-locking method of an optical disk drive in accordance with the present invention.

The track-locking method of an optical disk drive put forth in the present invention can be concluded as FIG. 9. First, a TE signal is detected, and whether the TE signal exceeds a threshold value is identified. If the TE signal exceeds the threshold value, the above-described steps for reshaping the TE signal into the TE' signal are performed. Then, a track-locking driving signal TRO is generated as the TE' signal passing the compensator 15, so as to drive the pickup head 18 to carry out the track-locking. If the TE signal does not exceed the threshold value, the TE signal reshaping is not required, i.e., the TE signal is deemed to be the TE' signal, and the TE signal is employed directly to pass the compensator 15 for generating the track-locking driving signal TRO, so as to drive the pickup head to carry out the track-locking.

In addition, according to crest value Tp and the trough value Tb of the real-time detected TE signal, the mean value, i.e., $$\frac{Tp + Tb}{2},$$

can serve as the real-time offset of the TE signal, or namely TE offset, in order to correct the offset of the TE signal in a timely manner.

The above-described embodiments of the present invention are intended to be illustrative only. Numerous alternative embodiments may be devised by those skilled in the art without departing from the scope of the following claims.

The invention claimed is:

1. A track-locking method for an optical disk drive, comprising the steps of: detecting a tracking error (TE) signal; dividing a time period that a pickup head of the optical disk drive jumps from one track to another track into a first period, a second period, a third period and a zero period; presetting extreme values of a reshaped tracking error (TE') signal in the first, second and third periods; reshaping the TE signal in the first period based on the preset extreme value of the TE' signal in the first period and a peak value of the TE signal, so as to form the TE' signal in the first period; establishing a line connecting the extreme values of the TE' signal in the first period and the second period as the TE' signal in the second period; and establishing a line connecting the extreme values of the TE' signal in the second period and the third period to reshape the TE' signal in the third period.

2. The track-locking method for an optical disk drive in accordance with claim 1, wherein the TE' signal in the first period is derived from the formula:

$$TE' = \frac{y1 \times TE}{Tx},$$

wherein Tx is the peak value of the TE signal, and y1 is the extreme value of the TE' signal in the first period.

3. The track-locking method for an optical disk drive in accordance with claim 1, wherein the TE' signal in the second period is derived from the formula:

$$TE' = y2 - \frac{y2 - y1}{Tx} \times TE,$$

wherein Tx is the peak value of the TE signal, y1 is the extreme value of the TE' signal in the first period, and y2 is the extreme value of the TE' signal in the second period.

4. The track-locking method for an optical disk drive in accordance with claim 1, wherein the TE' signal in the third period is derived from the formula:

$$TE' = y2 + \frac{y3 - y2}{Tx} \times TE,$$

wherein Tx is the peak value of the TE signal, y2 is the extreme value of the TE' signal in the second period, and y3 is the extreme value of the TE' signal in the third period.

5. The track-locking method for an optical disk drive in accordance with claim 1, further comprising the step of generating a radio frequency ripple (RFRP) signal and determining that the phase of the TE signal precedes or lags behind that of the RFRP signal, so as to identify whether the pickup head returns.

6. The track-locking method for an optical disk drive in accordance with claim 1, further comprising the step of differentiating the TE signal to determine whether the pickup head returns.

7. The track-locking method for an optical disk drive in accordance with claim 1, wherein the step of reshaping the TE signal will be performed if the TE signal exceeds a threshold value.

8. The track-locking method for an optical disk drive in accordance with claim 1, further comprising the step of adjusting the offset of the TE signal based on the crest and trough values of the TE signal.

9. The track-locking method for an optical disk drive in accordance with claim 1, further comprising the step of detecting a seek time of the pickup head.

10. The track-locking method for an optical disk drive in accordance with claim 9, wherein the TE' signal in the second period is derived from the formula:

$$TE' = y1 + \frac{4(y2 - y1)}{x} \times t,$$

wherein y1 and y2 are the extreme values of the first and second periods respectively, x is the seek time, and t is the time counted from the time when the pickup head enters the second period.

11. The track-locking method for an optical disk drive in accordance with claim 10, wherein the TE' signal appears as a horizontal region when t is larger than x/4 and the returning of the pickup head has not been detected.

12. The track-locking method for an optical disk drive in accordance with claim 10, wherein the level of the TE' signal is equivalent to y2 when t is larger than x/4 and the returning of the pickup head has not been detected.

13. The track-locking method for an optical disk drive in accordance with claim 10, wherein the TE' signal in the second period further comprises a horizontal region if the returning of the pickup head occurs in the second period but has not been detected.

14. The track-locking method for an optical disk drive in accordance with claim 13, wherein the level of the horizontal region is equivalent to y2.

15. The tracking-locking method for an optical disk drive in accordance with claim 10, wherein the time t is counted decreasingly in the next second period after the pickup head returns if the returning of the pickup head occurs and has been detected in the second period.

16. The tracking-locking method for an optical disk drive in accordance with claim 10, wherein the time t is counted decreasingly in the next second period after the pickup head returns if the pickup head returns in the third period.

17. The tracking-locking method for an optical disk drive in accordance with claim 16, wherein the time t is decreasingly counted from x/4 to 0.

18. The track-locking method for an optical disk drive in accordance with claim 9, wherein the TE' signal in the third period is derived from the formula:

$$TE' = y2 + \frac{4(y3 - y2)}{x} \times t,$$

wherein x is the seek time, t is the time counted from the time when the pickup head enters the third period, and y2 and y3 are the extreme values of the TE' signal in the second and third periods respectively.

19. The track-locking method for an optical disk drive in accordance with claim 18, wherein the TE' signal appears as a horizontal region when t is larger than x/4 and the returning of the pickup head has not been detected.

20. The track-locking method for an optical disk drive in accordance with claim 19, wherein the level of the horizontal region is equivalent to y3.

21. The track-locking method for an optical disk drive in accordance with claim 18, wherein the TE' signal in the third period further comprises a horizontal region if the returning of the pickup head occurs in the third period but has not been detected.

22. The track-locking method for an optical disk drive in accordance with claim 21, wherein the level of the horizontal region is equivalent to y3.

23. The track-locking method for an optical disk drive in accordance with claim 18, wherein the time t is counted decreasingly in the next third period after the pickup head returns if the returning of the pickup head occurs and has been detected in the third period.

24. The track-locking method for an optical disk drive in accordance with claim 18, further comprising the step of using the TE signal in the zero period as the TE' signal in the zero period.

25. The tracking-locking method for an optical disk drive in accordance with claim 24, wherein the time t is counted decreasingly in the next third period after the pickup head returns if the pickup head returns in the zero period of the next track and goes back to the original track.

26. The track-locking method for an optical disk drive in accordance with claim 25, wherein the time t is decreasingly counted from x/4 to 0.

27. The track-locking method for an optical disk drive in accordance with claim 24, wherein the period after the pickup head returns is the next first period if the pickup head returns in the zero period of the next track and the track-locking is targeted at the next track.

* * * * *